United States Patent [19]

Heine et al.

[11] Patent Number: 5,545,320

[45] Date of Patent: Aug. 13, 1996

[54] DEVICE FOR FILTERING AND SEPARATING FLOW MEDIA WITH FILTER ELEMENTS THAT ARE IN THE FORM OF MEMBRANE CUSHIONS

[75] Inventors: Wilhelm Heine, Hamburg; Jürgen Mohn, Reinbek, both of Germany

[73] Assignee: DT Membranfilter Vertriebs GmbH, Hamburg, Germany

[21] Appl. No.: 390,537

[22] Filed: Feb. 17, 1995

[30] Foreign Application Priority Data

Feb. 18, 1994 [DE] Germany ............... 44 05 175.1

[51] Int. Cl.$^6$ ............................................. B01D 63/00
[52] U.S. Cl. ....................... 210/321.6; 210/321.75; 210/321.84; 210/332; 210/233; 210/446; 210/335; 210/492; 96/9; 96/11
[58] Field of Search ............... 210/321.6, 321.72, 210/321.75, 321.84, 232, 233, 446, 335, 489, 492; 96/9, 11

[56] References Cited

U.S. PATENT DOCUMENTS

| | | | |
|---|---|---|---|
| 3,796,313 | 3/1974 | Bigt et al. | 210/321.75 |
| 4,501,663 | 2/1985 | Merril | 210/321.84 |
| 4,698,154 | 10/1987 | Mohn et al. | 210/321.75 |
| 4,892,657 | 1/1990 | Mohn et al. | 210/232 |
| 5,106,506 | 4/1992 | Schmidt et al. | 210/321.84 |
| 5,310,487 | 5/1994 | La Monica | 210/321.84 |

*Primary Examiner*—Ana Fortuna
*Attorney, Agent, or Firm*—Robert W. Becker & Associates

[57] ABSTRACT

A device for filtering and separating a flow medium by reverse osmosis, microfiltration, ultrafiltration or nanofiltration has a pressure-tight housing with an inlet for the flow medium and a first outlet for the retentate and a second outlet for the permeate. A plurality of stacked units comprised of spacer elements and membrane filter elements is provided. The spacer elements and the membrane filter elements are stacked alternatingly atop one another to form a stack. The stacked units further comprise two receptacle parts forming a receptacle for enclosing a stack of spacer elements and membrane filter elements. The stacked units are positioned adjacent to one another in the housing. The flow medium flows in sequence through the stacked units.

18 Claims, 4 Drawing Sheets

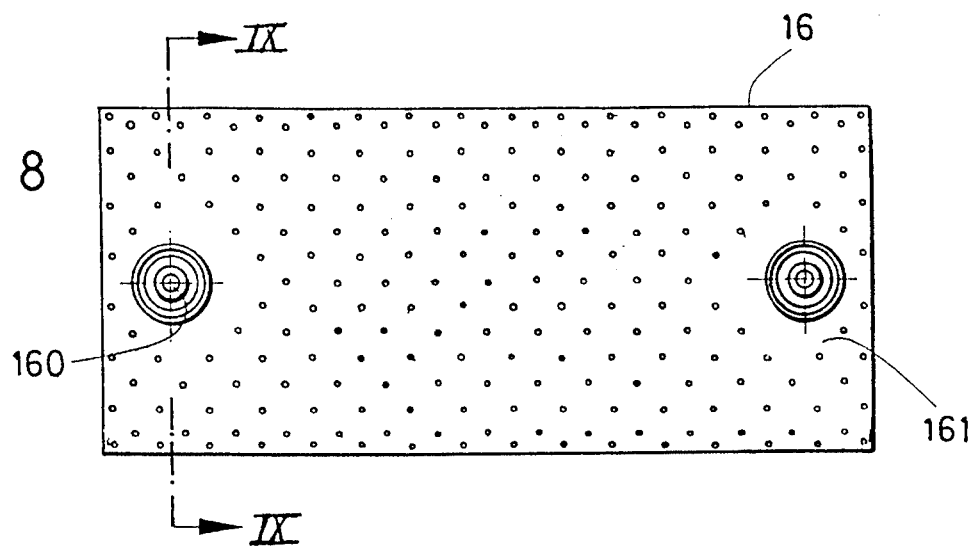
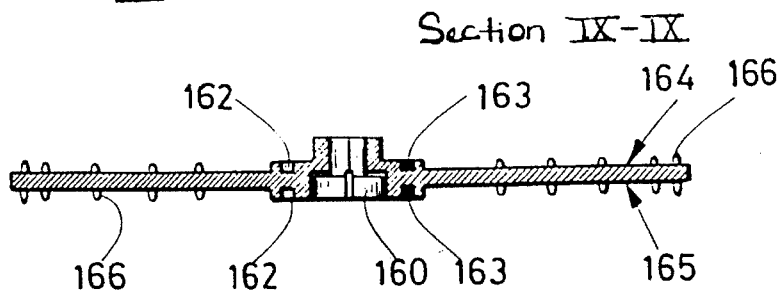
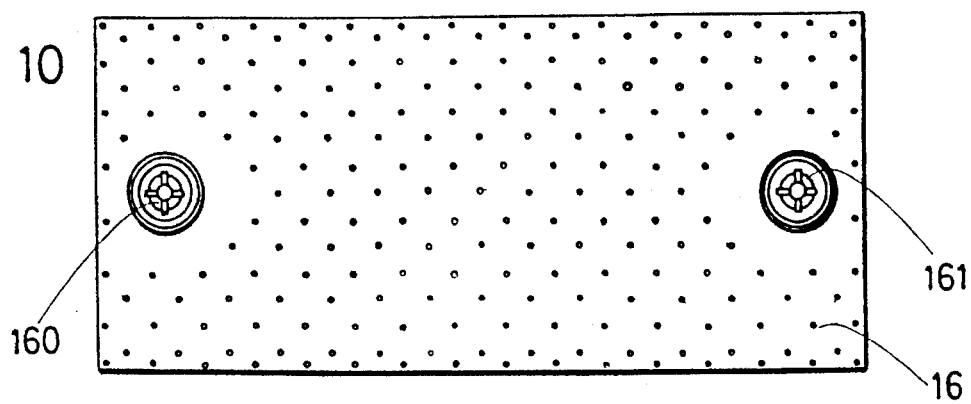

5,545,320

DEVICE FOR FILTERING AND SEPARATING FLOW MEDIA WITH FILTER ELEMENTS THAT ARE IN THE FORM OF MEMBRANE CUSHIONS

BACKGROUND OF THE INVENTION

The present invention relates to a device for filtering and separating flow media by reverse osmosis as well as by microfiltration, ultrafiltration, and nanofiltration with a pressure-tight housing having an inlet for the flow medium and an outlet for the retentate as well as for the permeate. A plurality of spacer elements are arranged within the housing whereby between two areal spacer elements, along which the flow medium passes, a filter element in the form of a membrane cushion is enclosed.

A device of the aforementioned kind is, for example, known from German Patent 37 15 183. In this known device the flow medium to be separated is introduced via an inlet of the device and passes in a controlled, regular pattern through the membrane cushions arranged between spacer elements so as to flow alternatingly from the exterior to the interior and from the interior to the exterior until it exits, after flowing past all of the membrane cushions, the device as an enriched retentate. The spacer elements are circular and the membrane cushions can also be of a circular design or, in approximation of a circular shape, may have the contour of a polygon.

With the known device very good results are achieved for certain applications such as sea water desalination, i.e., for producing portable water from sea water, whereby in the known device, even for large filter element stacks, the partial pressure differences of the flow medium between inlet and outlet remains within reasonable limits.

However, when flow media, for example, liquids with a high contents of organic and/or inorganic compounds must be separated, the rapid formation of a filter cake can disadvantageously be observed, because the compounds contained in the flow medium will deposit on the membrane cushions, respectively, at locations of the spacer elements at which the flow velocities of the flow medium is lower than at other locations of the device. This results in the device losing its separating capacity so that the device must be demounted and, if necessary, cleaned in a very complicated manner. This is especially disadvantageous in context with flow media of communal and/or industrial waste waters and highly loaded percolating water streams as, for example, occur at landfills. Such devices therefore are not suitable since, especially for the specified applications, the separating device must function essentially maintenance-free because an interruption of the function of the device for cleaning, maintenance, and replacement purposes would result in unacceptable ecological and economical consequences.

It is therefore an object of the present invention to provide a device of the aforementioned kind which is able, among other things, to separate liquids with a high organic and/or inorganic compound contents, for example, industrial and communal waste waters as well as highly loaded percolating water streams whereby no deposits in form of filter cakes should result during operation. Furthermore, the device, if this should become necessary, should allow for simple cleaning and maintenance and should provide for an inexpensive and simple manufacture. It should also be adaptable to individual loading degrees of the liquids to be separated.

SUMMARY OF THE INVENTION

A device for filtering and separating a flow medium by one of the methods selected from the group consisting of reverse osmosis, microfiltration, ultrafiltration, and nanofiltration is primarily characterized by:

A pressure tight housing having an inlet for the flow medium and a first outlet for the retentate and a second outlet for the permeate;

A plurality of stacked units comprised of spacer elements and membrane filter elements, wherein the spacer elements and the membrane filter elements are stacked alternatingly atop one another to form a stack; and The stacked units sequentially arranged in the housing, wherein the flow medium flows sequentially through the stacked units.

Advantageously, the stacked units further comprise two receptacle parts forming a receptacle for enclosing the stack of spacer elements and membrane filter elements, the receptacle parts having a substantially semi-circular cross-section.

Preferably, at least one of the receptacle parts has a permeate channel extending in a longitudinal direction of the stacked unit and permeate outlet openings provided at a bottom of the at least one receptacle part, whereby the permeate outlet openings communicate with the permeate channel.

Expediently, the bottom of the receptacle parts is substantially planar and has a plurality of projections. The projections, in a plane parallel to the surface of the bottom, have a substantially circular or, in the alternative, substantially drop-shaped cross-section.

Preferably, the receptacle parts have a substantially rectangular inner cross-section.

In a preferred embodiment of the present invention, the receptacle parts are detachably connected to one another with connecting elements for enclosing the stack of spacer elements and membrane filter elements.

Advantageously, the receptacle parts form a receptacle and the receptacles are detachably connected to one another with a bayonet joint having cooperating joint parts connected to each one of the receptacles.

Preferably, the device further comprises securing means for detachably securing the receptacles to one another when detachably connected with the bayonet joint.

Expediently, the receptacle parts are made of plastic. The plastic is preferably polystyrene, acrylontrile butadiene styrene copolymer, styrene acrylonitrile copolymer, or Luran.

Luran ® is a trademark registered in Germany for a styrene acrylonitrile copolymer (SAN) distributed by BASF, Ludwigshafen, Germany.

Preferably, the spacer elements have a substantially rectangular form and have two permeate outlet openings spaced from one another in the longitudinal direction of the spacer elements.

Advantageously, the device further comprises a recess surrounding each one of the permeate outlet openings and a sealing element received in the recess for sealing the permeate opening relative to the membrane filter elements.

Advantageously, the spacer elements have surfaces facing the membrane filter elements, the surfaces provided with a plurality of projections. The projections, in a plane parallel to the surfaces, preferably have a substantially circular or a substantially drop-shaped cross-section.

Expediently, the spacer elements are made of plastic, for example, polystyrene, acrylonitrile butadiene styrene copolymer, styrene acrylonitrile copolymer, or Luran®.

According to the present invention, the housing contains a plurality of separate stacked units comprising stacks of spacer elements with membrane filter elements interposed between the spacer elements. The stacked units are arranged adjacent (sequentially) to one another and the flow medium flows through them in sequence.

The advantage of the inventive device is that with the inventive arrangement of the stacked units of spacer elements with interposed filter elements within the device, i.e., within the housing, a substantially open channel is provided for the flow medium with which, in contrast to the aforementioned devices of the prior art, extremely high flow velocities of the flow medium between the inlet of the flow medium and the outlet of the retentate leaving the device is possible. This prevents the formation of deposits, for example, in the form of a filter cake, since the stacked units of spacer elements and interposed membrane filter elements essentially are free of any dead zones for the flow medium flowing through the longitudinal channel. The flow medium can essentially flow without deflection from the inlet to the outlet of the device.

According to an advantageous embodiment of the invention, the stacked units comprise two receptacle parts, each having a substantially semi-circular outer cross-sectional contour, for enclosing the spacer elements and the membrane filter elements. Thus it is possible to prefabricate a stacked unit comprised of a stack of spacer elements and interposed membrane filter elements enclosed by the receptacle parts so that the resulting stacked units must only be placed adjacent to one another (sequentially) into the housing of the device, whereby their number is selected as a function of the degree of loading of the liquid to be separated.

In order to limit the number of individual components of the device, especially with respect to avoiding expensive manufacture, it is advantageous that at least one of the receptacle parts is provided with a permeate channel extending in the longitudinal direction of the receptacle part. This channel is connected to permeate outlet openings that are provided at the inner bottom of the receptacle part. With this embodiment, the permeate channel is essential an integral part of the receptacle part.

Advantageously, the inner cross-section of the receptacle parts is substantially rectangular with such selected dimensions that the membrane/spacer element stack is frictionally connected between two of the receptacle parts having a semi-circular outer contour. This means that the membrane filter elements, together with the interposed spacer elements, are received in the receptacle such that no additional clamping bolts are required which, in the device of the prior art, pass through the membrane filter elements and the spacer elements. This frictional connection of the stacks, comprised of membrane filter elements and spacer elements, and the receptacle parts can advantageously be achieved by detachably connecting the receptacle parts with connecting means for enclosing the respective stack of membrane filter elements and spacer elements. The connecting means may be in the form of a bolt/nut connection.

According to another advantageous embodiment of the invention the receptacle comprised of two connectable receptacle parts can be connected to an adjacent receptacle with a bayonet joint having cooperating parts connected to both of the receptacles. This means that the adjacently placed receptacles can be easily frictionally connected to one another. With this method of connecting the receptacles to one another, any desired number of receptacles can be connected sequentially whereby their number depends on the contents of compounds in the liquid to be separated, respectively, on other necessary specifications with regard to the desired degree of separation of the device.

Two neighboring receptacles may be detachably secured to one another when connected with the connecting means, for example, with a bolt/nut connection. This securing means also allows for a complete premounting of a certain number of receptacles for insertion into the housing of the device.

The spacer elements to be used in the present invention have advantageously a substantially rectangular shape and are provided in the longitudinal direction with two permeate outlet openings that are spaced from one another. This allows for an optimized outflow of the permeate.

In order to ensure that the membrane filter elements in the area of the permeate outlet openings are sealed relative to the adjacent spacer elements, recesses are provided about the permeate outlet openings into which sealing elements are inserted for providing a sealing action relative to the filter elements. The same holds true also for the permeate outlet openings provided at the bottoms of the receptacle parts so that the filter membrane element between the respectively first or last spacer element of a stack and the bottom of the receptacle part is sealed in the same manner relative to the receptacle part.

In order to ensure that the membrane filter element, along which the flow medium flows on both sides in an areal fashion, can rest on the spacer element, respectively, on the bottom of the receptacle part with a surface area that is as small as possible, the surfaces of the spacer elements and/or the bottoms of the receptacle parts are provided with a plurality of projections so that the elements filter rest only on certain points of the neighboring spacer elements, respectively, bottom of the receptacle part.

Even though the projections can have, in general, any suitable form, it is preferable that, in a plane parallel to the surface and/or to the bottom, they have a substantially circular cross-section or, in the alternative, have a drop-shaped cross-section.

The spacer elements and/or the receptacle parts, in general, can be produced of any suitable material. Preferably, they are made of plastic material so that these parts can be manufactured in a simple and inexpensive way, for example, by injection molding. Thus, these parts and elements can be mass-produced inexpensively.

Suitable plastic materials are, for example, polystyrene, acrylonitrile butadiene styrene copolymer (ABS), styrene acrylonitrile copolymer (SAN) or Luran®.

BRIEF DESCRIPTION OF THE DRAWINGS

The object and advantages of the present invention will appear more clearly from the following specification in conjunction with the accompanying drawings, in which:

FIG. 8 shows a plan view of a spacer element that together with membrane filter elements and two receptacle parts according to FIG. 7 forms a stacked unit;

FIG. 9 shows a section along the line IX— IX of FIG. 8 in an enlarged representation;

FIG. 10 shows a view of the spacer element represented in FIG. 8 from the bottom; and FIGS. 11a, 11b show in section different embodiments of the projections provided at the spacer elements and/or the bottom of the receptacle parts.

DESCRIPTION OF PREFERRED EMBODIMENTS

Figure 1:
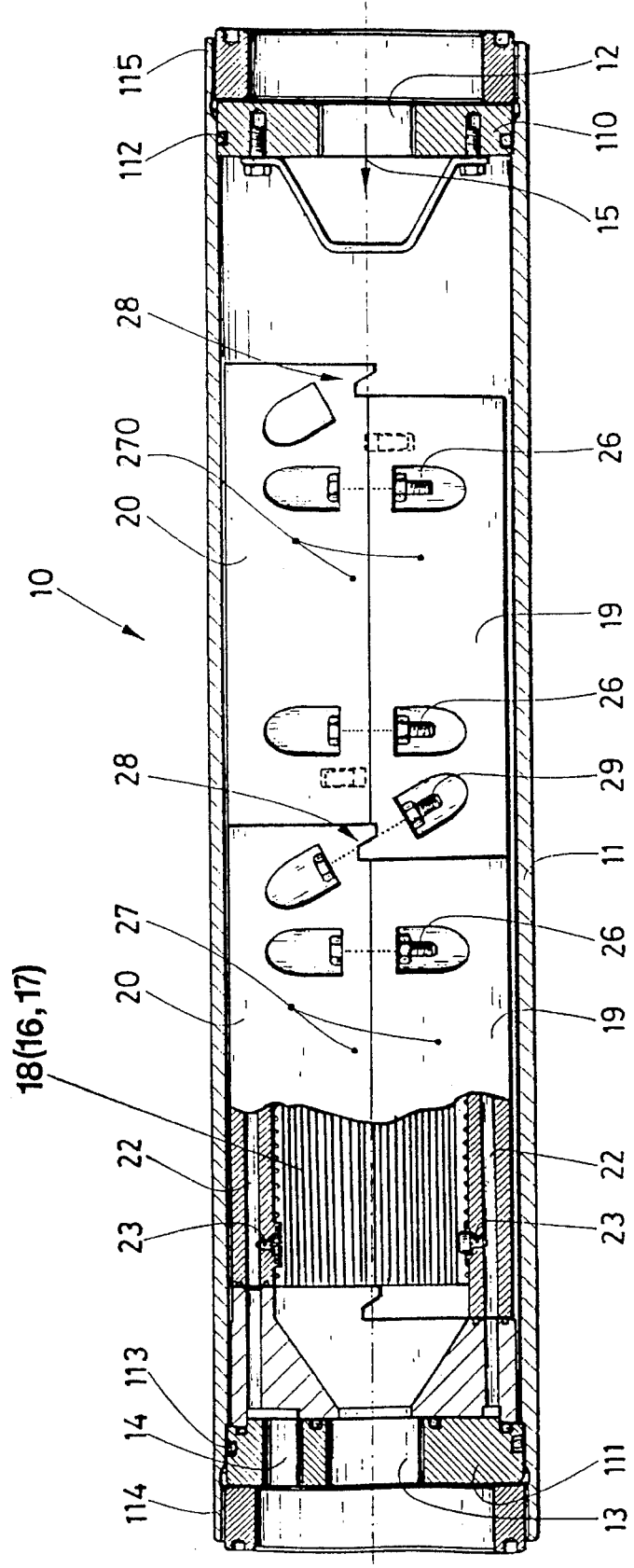
FIG. 1 shows in a side view and partially in section the device with two receptacles in which a stack of a plurality of spacer elements and interposed membrane filter elements is arranged.

The present invention will now be described in detail with the aid of several specific embodiments utilizing FIGS. 1 through 11.

The device 10 is comprised substantially of a housing 11 that, in a manner known per se, is provided on both ends with end elements 110, 111 for sealing the housing 11 in a pressure-tight manner with circumferentially extending sealing means 112, 113, for example, in the form of so-called O-rings. The end element 110 is provided with an inlet 12 for the flow medium 15 to be supplied to the device 10. The end element 111 has an outlet 13 for the enriched flow medium, the so-called retentate, and an outlet 14 for the permeate. The end elements 110, 111 are secured in their position at the housing 11 with annular elements 114, 115 having an exterior thread whereby the housing 11 at the corresponding location is provided with an inner thread for engaging the annular elements 114, 115. The housing 11 has preferably a circular cross-section. However, this is not necessary in all embodiments.

Figure 2:
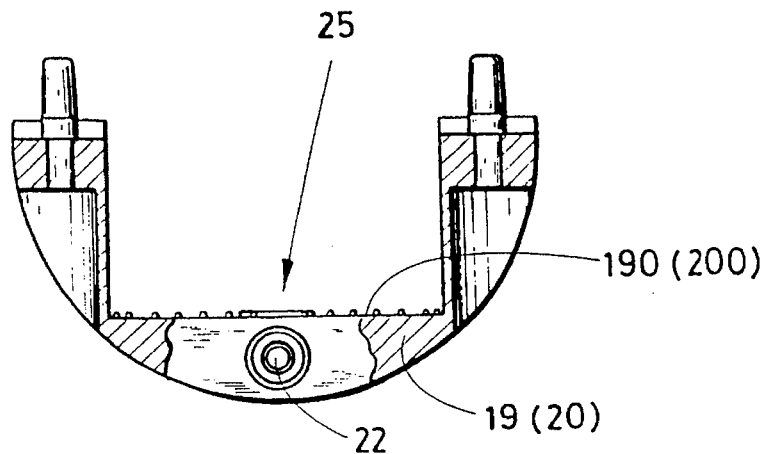
FIG. 2 shows in an end view transverse to the representation of FIG. 1 a part-sectional view of a receptacle.
Figure 3:
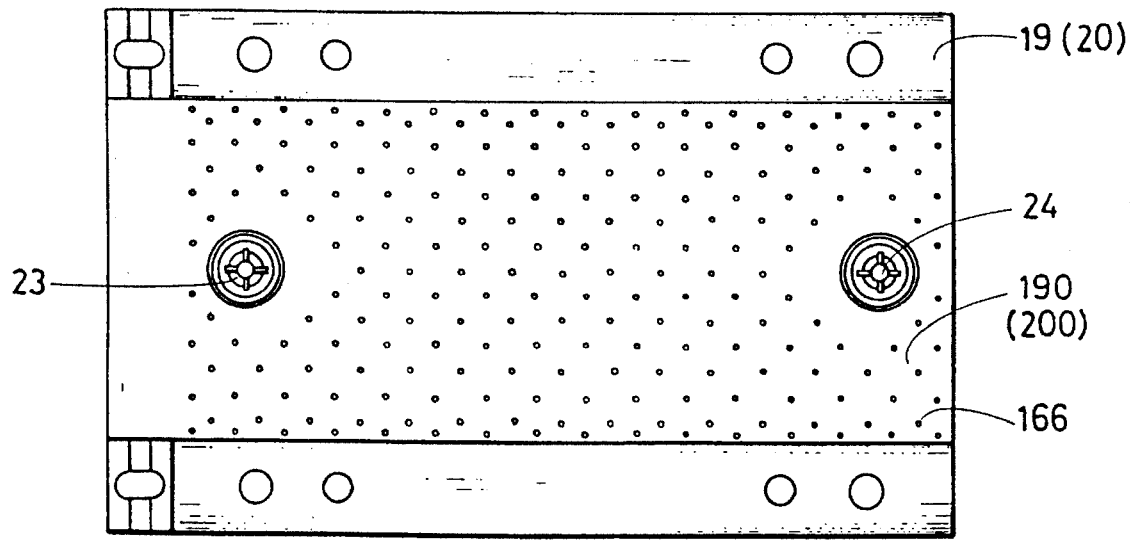
FIG. 3 shows a plan view of the receptacle represented in FIG. 2.
Figure 4:
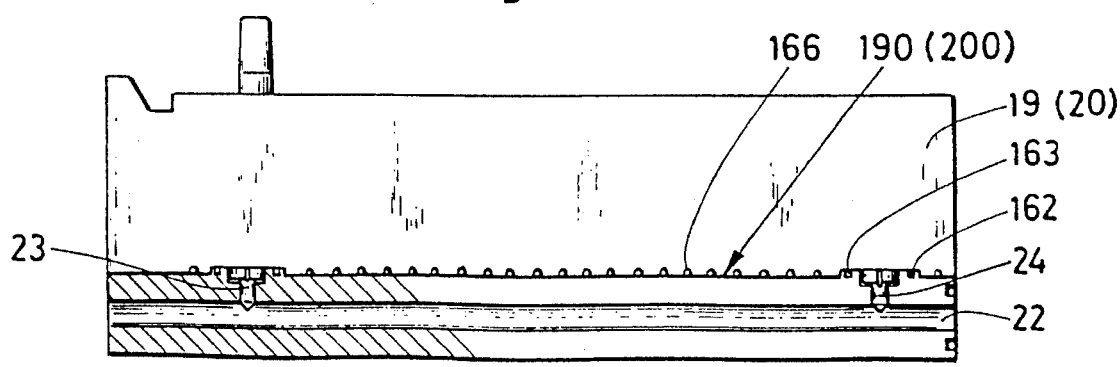
FIG. 4 shows a longitudinal section of the receptacle represented in FIG. 3.
Figure 5:
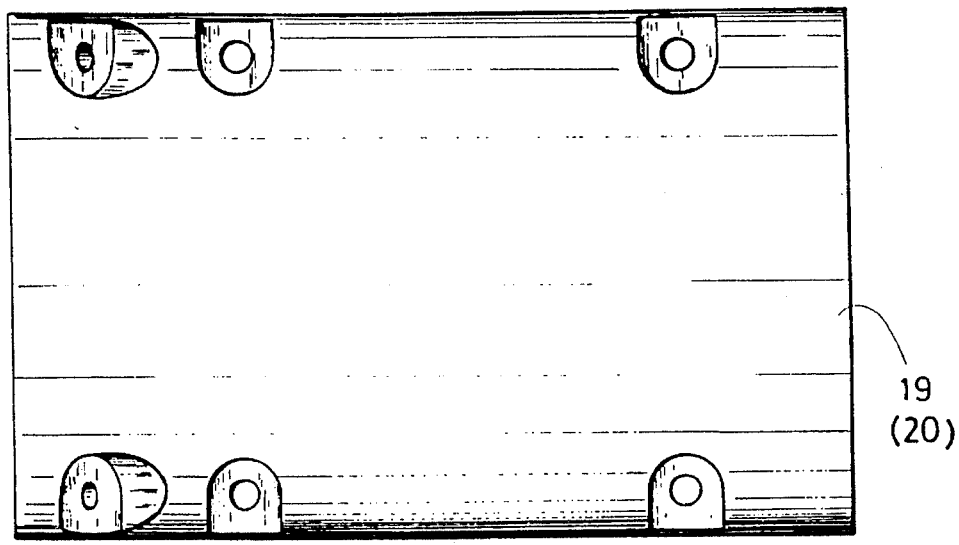
FIG. 5 shows a view of a receptacle from the top according to the representation of FIG. 1.
Figure 6:
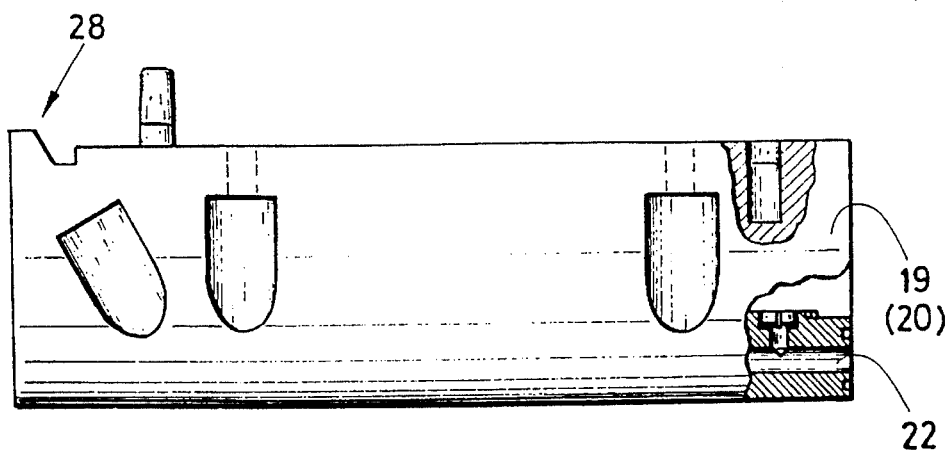
FIG. 6 shows in a side view a receptacle according to FIG. 5.
Figure 7:
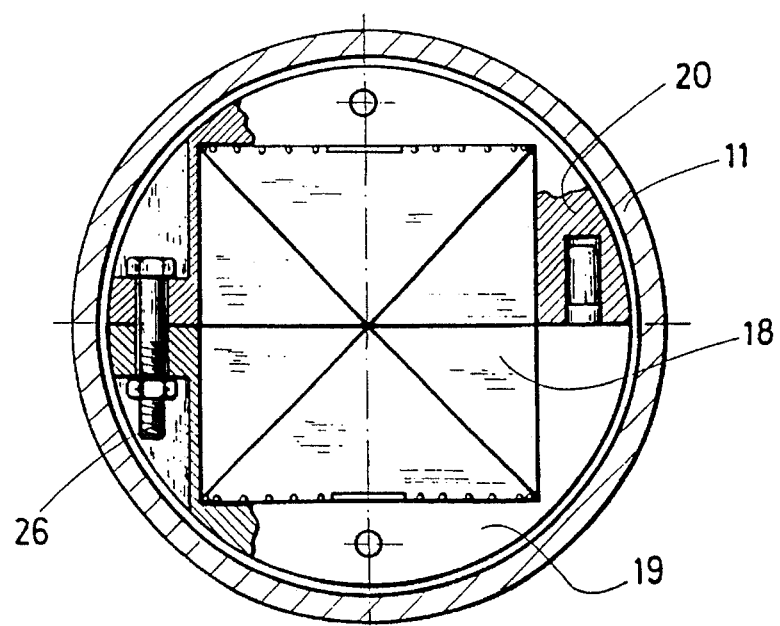
FIG. 7 shows a schematic sectional view of a stacked unit comprised of two receptacle parts after insertion into the housing.

In the housing 11 a plurality of receptacles 27, 270 are provided whereby in the shown embodiment according to FIG. 2 two receptacles 27, 270 are shown. It should be mentioned that the number of receptacles 27, 270 for each device 10 can be selected as desired as a function of the length of the housing 11 and also as a function of the liquid to be separated, respectively, the type and amount of organic and/or inorganic compounds contained in the liquid.

The receptacles 27, 270 are all identical to one another so that in the following only of the receptacles 27 will be described. The receptacle 27 is comprised of two receptacle parts 19, 20, see FIG. 7. The receptacle parts 19, 20 have a substantially semi-circular outer cross-sectional contour. The inner cross-sectional contour of the receptacle parts 19, 20 is substantially rectangular whereby two of the receptacle parts 19, 20 (see FIG. 7) that are connected to one another have a substantially square, respectively, rectangular inner cross-section. The receptacle parts 19, 20 can be detachably connected to one another with connecting means 26, for example, with a bolt/nut connection. Two receptacle parts 19, 20 enclose in a frictional manner a stack 18 that is comprised of a plurality of spacer elements 16, see FIGS. 8 to 10. Between two adjacent spacer elements 16 a membrane filter element 17 is respectively arranged. The membrane filter element 17 of the kind to be used in the present invention for forming the stack 18 together with the spacer elements 16 is, for example, disclosed in European Patent 0 129 663. The membrane filter element 17 to be used in connection with the inventive device 10 has a construction as disclosed in the above mentioned patent document. Thus, with respect to design and construction of the membrane filter element 17 reference is made to this aforementioned document.

The spacer element 16 has a substantially rectangular shape. Permeate outlet openings 160, 161 are provided which are spaced from one another in the longitudinal direction. The permeate outlet openings 160, 161 are surrounded by groove-shaped recesses 162 in which a sealing element 163 for a sealing action relative to the membrane filter elements 17 are received. The bottom surfaces 190, 200 of the receptacle parts 19, 20 are also provided with permeate outlet openings 23, 24 in analogy to the permeate outlet openings 160, 161 of the spacer elements 16. These permeate outlet openings 23, 24 are also surrounded by groove-shaped recesses 162 into which are inserted sealing elements 163 for a sealing action relative to the membrane filter elements 17.

The permeate outlet openings 23, 24 in the receptacle parts 19, 20, which in the longitudinal direction have the same distance relative to one another as the permeate outlet openings 160, 161 of the spacer elements 16, open into a permeate channel 22 extending in the longitudinal direction of the receptacle parts 19, 20.

The aforedescribed stack 18 is thus frictionally enclosed between two receptacle parts 19, 20 with the aid of connecting means 26 whereby in the connected state of the receptacle parts 19, 20 it is ensured that the permeate, separated by the membrane filter elements 17, flows at the end face of the filter element 17 from permeate outlet openings of these filter elements 17 into the permeate outlet openings 160, 161 of the space elements 16 and via the permeate outlet openings 23, 24 of the receptacle parts 19, 20 in order to be collected within the permeate channel 22. From the permeate channel 22 the permeate is then guided to the outlet 14 of the device 10.

On the surfaces 164, 165 of the spacer elements 16 and of the bottoms 190, 200 of the receptacle parts 19, 20 a plurality of projections 166 is provided. This ensures that the membrane filter elements 17 rest only at certain points on the spacer element 16, respectively, on the bottoms 190, 200 of the receptacle parts 19, 20.

Two adjacent receptacles 27, 270 of the aforedescribed construction can be detachably connected to one another with a bayonet joint 28 having parts connected to both of the receptacles. In the connected state the bayonet joint 28 connecting two neighboring receptacles 27, 270 can be secured with a connecting means 29. This connecting means 29 can, for example, be in the form of a bolt/nut connection similar to the connecting means 26 for connecting the two receptacle parts 19, 20. At the surfaces 164, 165 of the spacer element 16 and/or the bottom 190, 200 of the receptacle parts 19, 20 a plurality of projections 166 extending from the surfaces 164, 165, respectively, from the surfaces of the bottoms 190, 200 are provided. The projections 166 can have, in a plane parallel to the surfaces 164, 165, respectively, to the surfaces of the bottoms 190, 200, a substantially circular or drop-shaped cross-section. In general, the projections 166 can have any suitable shape and can also have different heights at different locations of the surfaces 164, 165 of the spacer element 16, respectively, of the surfaces of the bottoms 190, 200 of the receptacle parts 19, 20. The spacer element 16 and/or the receptacle parts 19, 20 can be comprised of plastic material, preferably of a plastic material that is injection-moldable. The plastic can be polystyrene, acrylnitrile butadiene styrene copolymer (ABS), styrene acrylonitrile copolymer (SAN) or Luran.

For the intended operation of the device 10, a certain number of stacked units comprising the stacks 18 and the receptacles 27 are prepared in the aforedescribed manner. The prepared, i.e., preassembled, stacked units (represented in the drawing by the receptacles 27 that have enclosed therein the stacks 18 comprised of spacer elements 16 and filter elements 17) are then connected to one another with the bayonet joint 28 provided at two adjacent receptacles 27, 270 and are secured with connecting means 29. Subsequently, the plurality of stacked units connected to one another are inserted into one opening (for example, at 110) of the housing 11 whereby it is ensured that the permeate channel 22 of the individual receptacles 27 are connected to one another so as to be pressure-tight. The permeate channel 22 of the last receptacle 27 must open into a corresponding opening of the end element 111 that closes off the opposite housing opening. Subsequently, the housing 11 is closed off with the second end element 110 via the annular element 115 whereby it is ensured that an axial movement of the stacked receptacles 27 connected to one another within the housing 11 is not possible. For the inventive operation the flow medium (arrow 15) is then introduced into the device 10 and flows through all of the membrane filter elements 17 arranged behind one another essentially in the form of an open channel. The sequential arrangement of the receptacles 27, respectively, the stacks 18 positioned therein provides for such an "open channel" flow. Thus, a high flow velocity of the flow medium (15) is ensured from the inlet 12 to the outlet 13. The permeate that is produced in a manner known per se by the membrane filter element 17, flows via the permeate outlet openings 160, 161, respectively, the permeate outlet openings 23, 24 of the receptacle parts 19, 20 to the permeate channel 22 and from there to the outlet 14 of the device 10 and is then used as desired.

The present invention is, of course, in no way restricted to the specific disclosure of the specification and drawings, but also encompasses any modifications within the scope of the appended claims.

What we claim is:

1. A device for filtering and separating a flow medium by one of the methods selected from the group consisting of reverse osmosis, micro filtration, ultra filtration, and nano filtration, said device comprising:

a pressure-tight housing having an inlet for the flow medium and a first outlet for the retentate and a second outlet for the permeate;

a plurality of stacked units comprised of spacer elements and membrane filter elements, wherein said spacer elements and said membrane filter elements are stacked alternatingly atop one another to form a stack;

said stacked units sequentially arranged in said housing, wherein the flow medium flows in sequence through said stacked units; and wherein said stacked units further comprise two receptacle parts forming a receptacle for enclosing said stack of said spacer elements and said membrane filter elements, said receptacle parts having a substantially semi-circular cross-section.

2. A device according to claim 1, wherein at least one of said receptacle parts has a permeate channel extending in a longitudinal direction of said stacked unit and permeate outlet openings provided at a bottom of said at least one receptacle part, said permeate outlet openings communicating with said permeate channel.

3. A device according to claim 2, wherein said bottom of said receptacle parts is substantially planar and has a plurality of projections.

4. A device according to claim 2, wherein said projections in a plane parallel to a surface of said bottom have a substantially circular cross-section.

5. A device according to claim 3, wherein said projections in a plane parallel to a surface of said bottom have a substantially drop-shaped cross-section.

6. A device according to claim 1, wherein said receptacle parts have a substantially rectangular inner cross-section.

7. A device according to claim 1, wherein said receptacle parts are detachably connected to one another with connecting elements for enclosing said spacer elements and said membrane filter elements.

8. A device according to claim 1, wherein said receptacles are detachably connected to one another with a bayonet joint having cooperating joint parts connected to each one of said receptacles.

9. A device according to claim 8, further comprising securing means for detachably securing said receptacles to one another when detachably connected with said bayonet joint.

10. A device according to claim 1, wherein said receptacle parts are made of plastic.

11. A device according to claim 10, wherein said plastic is selected from the group consisting of polystyrene, acrylonitrile butadiene styrene copolymer, styrene acrylonitrile copolymer, and Luran (styrene acrylonitrile copolymer).

12. A device according to claim 1, wherein said spacer elements have a substantially rectangular form and have two permeate outlet openings spaced from one another in the longitudinal direction of said spacer elements.

13. A device according to claim 12, further comprising a recess surrounding each one of said permeate outlet opening and a sealing element received in said recess for sealing said permeate opening relative to said membrane filter elements.

14. A device according to claim 12, wherein said spacer elements have surfaces facing said membrane filter elements, said surfaces provided with a plurality of projections.

15. A device according to claim 14, wherein said projections in a plane parallel to said surfaces have a substantially circular cross-section.

16. A device according to claim 14, wherein said projections in a plane parallel to said surfaces have a substantially drop-shaped cross-section.

17. A device according to claim 1, wherein said spacer elements are made of plastic.

18. A device according to claim 17, wherein said plastic is selected from the group consisting of polystyrene, acrylonitrile butadiene styrene copolymer, styrene acrylonitrile copolymer, and Luran (styrene acrylonitrile copolymer).

* * * * *